(12) United States Patent
Damon

(10) Patent No.: US 6,973,987 B2
(45) Date of Patent: *Dec. 13, 2005

(54) BATTERY RETAINER ASSEMBLY FOR CHILDREN'S RIDE-ON VEHICLES

(75) Inventor: Daniel J. Damon, South Wales, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/808,048

(22) Filed: Mar. 23, 2004

(65) Prior Publication Data

US 2005/0056474 A1   Mar. 17, 2005

Related U.S. Application Data

(63) Continuation-in-part of application No. 10/660,904, filed on Sep. 11, 2003.

(51) Int. Cl.$^7$ .............................................. B60R 16/04
(52) U.S. Cl. .................................... 180/68.5; 180/65.1
(58) Field of Search .............................. 180/68.5, 65.1, 180/65.6; 280/827, 828; 248/500, 503; 429/86, 429/97, 99, 100; 292/40, 162, 163, 173

(56) References Cited

U.S. PATENT DOCUMENTS

| 162,979 A | 5/1875 | Walker |
|---|---|---|
| 1,392,757 A | 10/1921 | Gales |
| 1,636,562 A | 7/1927 | Hick |
| 1,934,588 A | 11/1933 | Butler |
| 1,993,893 A | 3/1935 | Page, Jr. |
| 2,031,508 A | 2/1936 | Scott |
| 2,136,749 A | 11/1938 | Martino |
| 2,588,870 A | 3/1952 | Pittman |
| 2,699,963 A | 1/1955 | Hampton |
| 3,165,163 A | 1/1965 | Holka |
| 3,333,810 A | 8/1967 | Schlapman |
| 3,704,761 A | 12/1972 | Barrett, Jr. |
| 3,930,552 A | 1/1976 | Kunkle et al. |
| 3,991,844 A | 11/1976 | Reynier |
| 4,063,607 A | 12/1977 | Patrick |

(Continued)

FOREIGN PATENT DOCUMENTS

JP    56-168355    12/1981

OTHER PUBLICATIONS

English-language abstract of Japanese Patent No. JP 56-168355, 1981.

Primary Examiner—Hau Phan
(74) Attorney, Agent, or Firm—Kolisch Hartwell, P.C.

(57) ABSTRACT

Battery retainer assemblies and children's ride-on vehicles including the same. The retainer assembly includes a retaining member coupled to the vehicle's battery compartment. The retaining member is selectively moved between an open position, in which the retaining member permits the battery assembly to be inserted into or removed from the compartment, and a closed position, in which the retaining member obstructs removal of the battery assembly. In some embodiments, the retaining member is adapted to displace the battery assembly as the retaining member is moved to the open position. In some embodiments, the retaining member is adapted to automatically move to the closed position upon insertion of the battery assembly into the compartment and/or engagement with the retaining member. In some embodiments, the retaining member is retained in the open position until selectively released therefrom by a user. Upon release, the retaining member may automatically move to the closed position.

42 Claims, 10 Drawing Sheets

U.S. PATENT DOCUMENTS

| | | |
|---|---|---|
| 4,146,682 A | 3/1979 | Nakao |
| 4,221,450 A | 9/1980 | Sears |
| 4,339,105 A | 7/1982 | Witt |
| 4,355,695 A | 10/1982 | Leskovec |
| 4,511,637 A | 4/1985 | Evans |
| 4,514,477 A | 4/1985 | Kobayashi |
| 4,577,262 A | 3/1986 | Buteaux |
| 4,632,201 A | 12/1986 | Kay |
| 4,696,508 A | 9/1987 | Brautigam |
| 4,716,632 A | 1/1988 | Perl |
| 4,991,674 A | 2/1991 | Fullenkamp |
| 5,004,081 A | 4/1991 | Custer |
| 5,222,711 A | 6/1993 | Bell |
| 5,307,890 A | 5/1994 | Huang |
| 5,434,494 A | 7/1995 | Perego |
| 5,477,936 A | 12/1995 | Sugioka et al. |
| 5,543,248 A | 8/1996 | Dougherty et al. |
| 5,681,668 A | 10/1997 | Reed et al. |
| 5,845,724 A | 12/1998 | Barrett |
| 6,105,982 A | 8/2000 | Howell et al. |
| 6,161,810 A | 12/2000 | Crow et al. |
| 6,179,331 B1 | 1/2001 | Jones, Jr. et al. |
| 6,186,256 B1 | 2/2001 | Dignitti |
| 6,347,679 B1 | 2/2002 | Dignitti et al. |
| 6,371,535 B2 | 4/2002 | Wei et al. |
| 6,508,322 B2 | 1/2003 | Dignitti et al. |

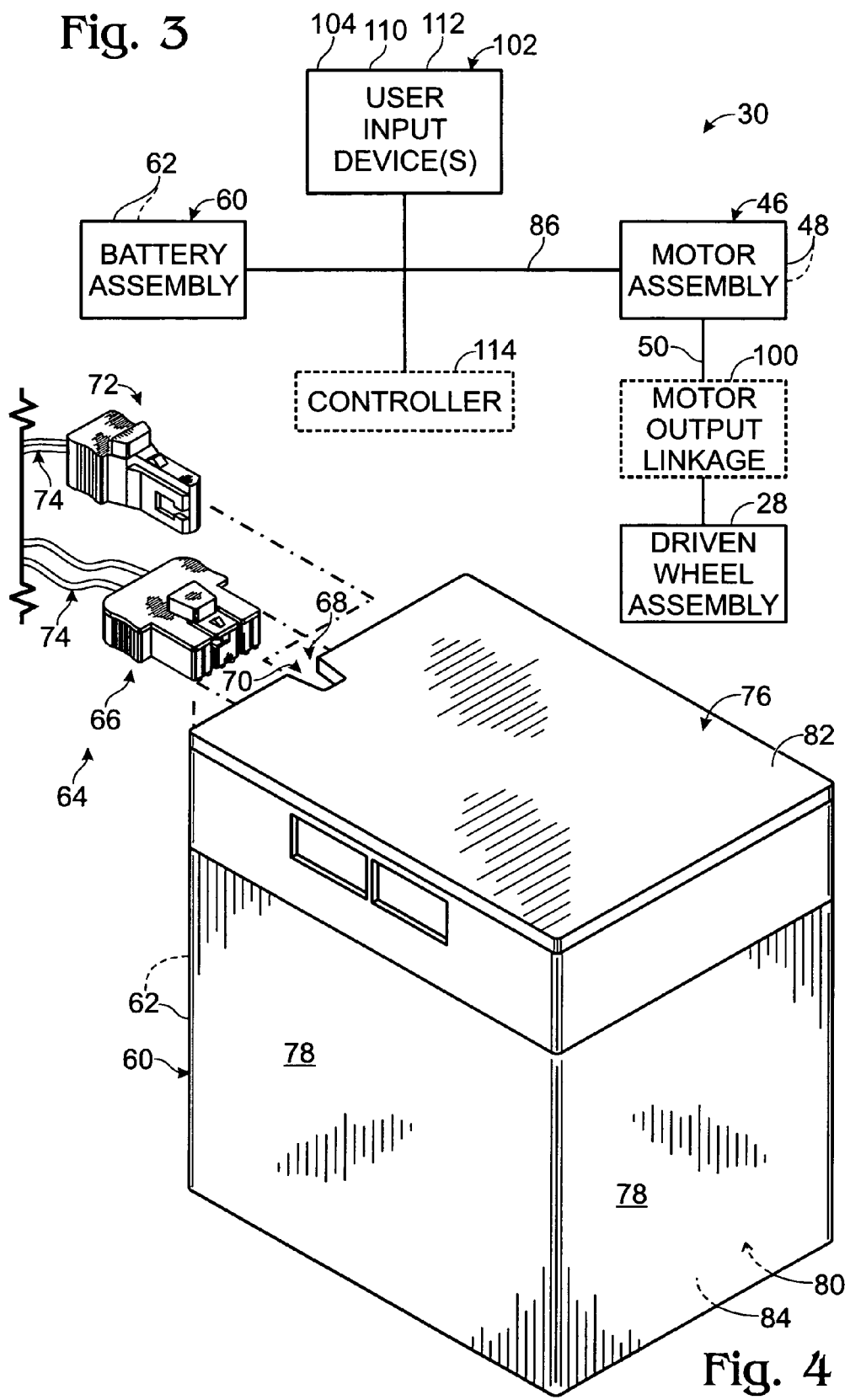

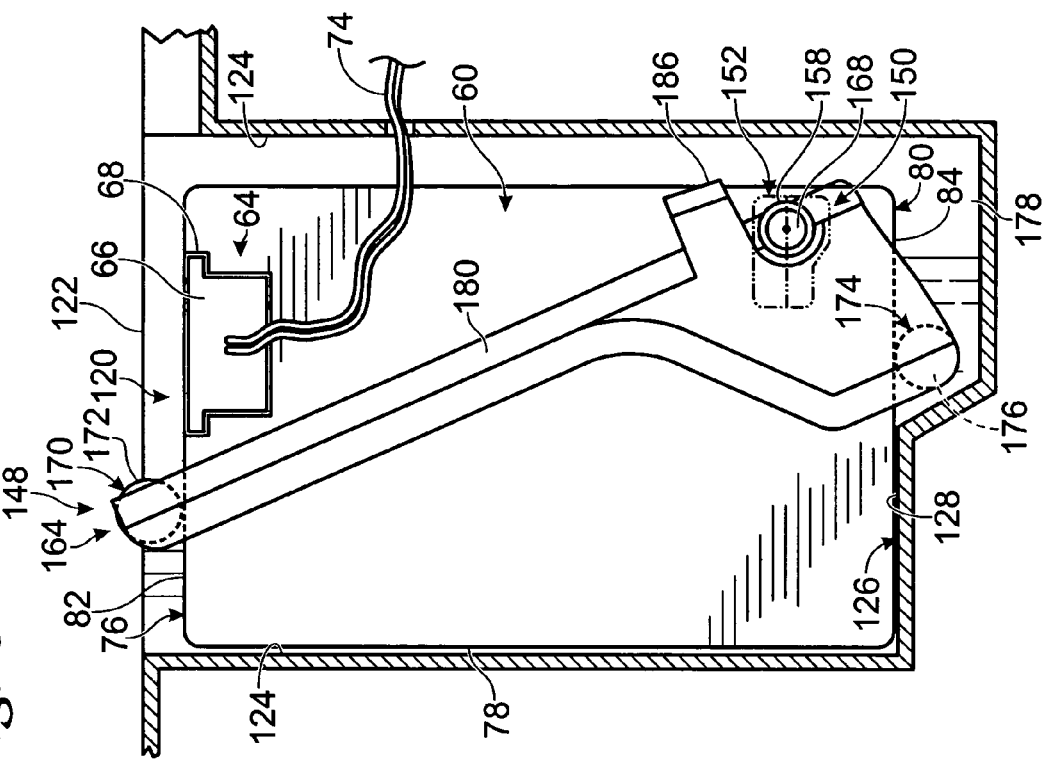
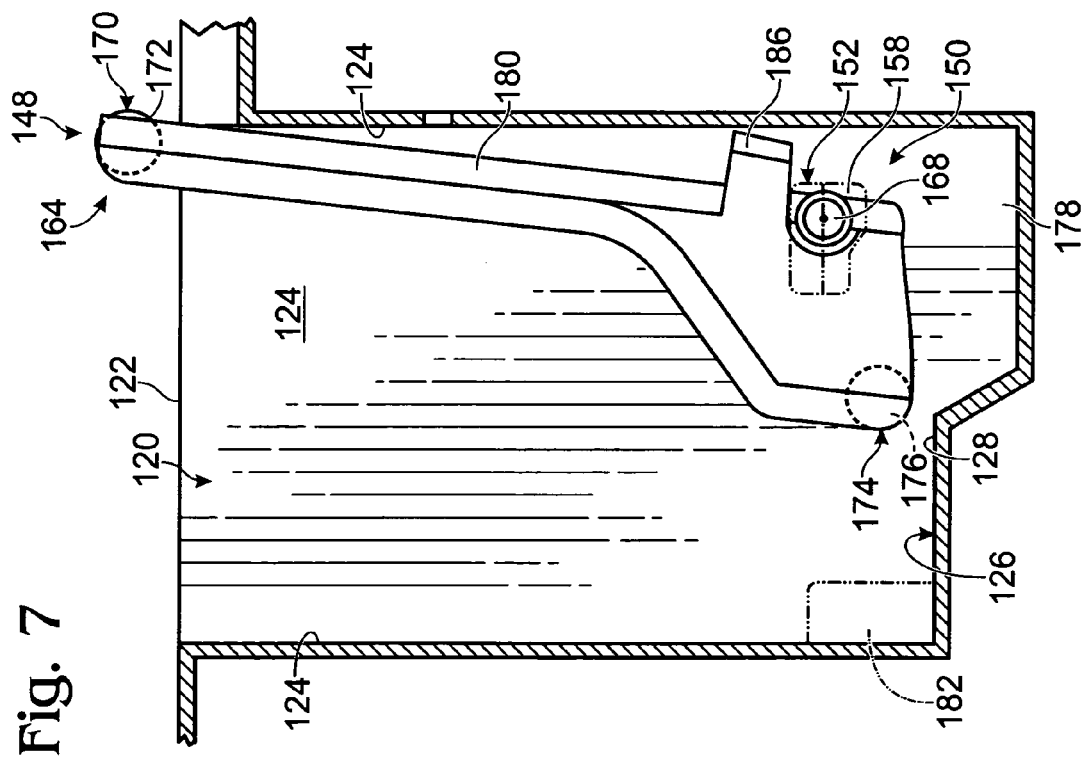
Fig. 7
Fig. 8

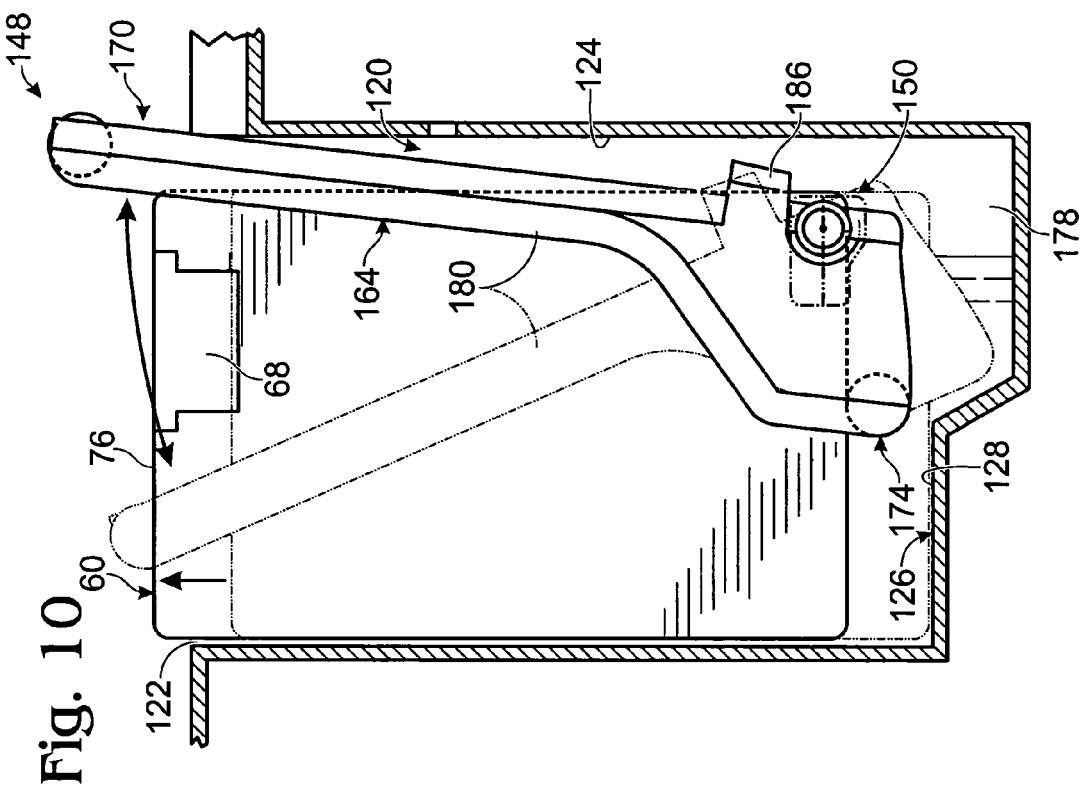
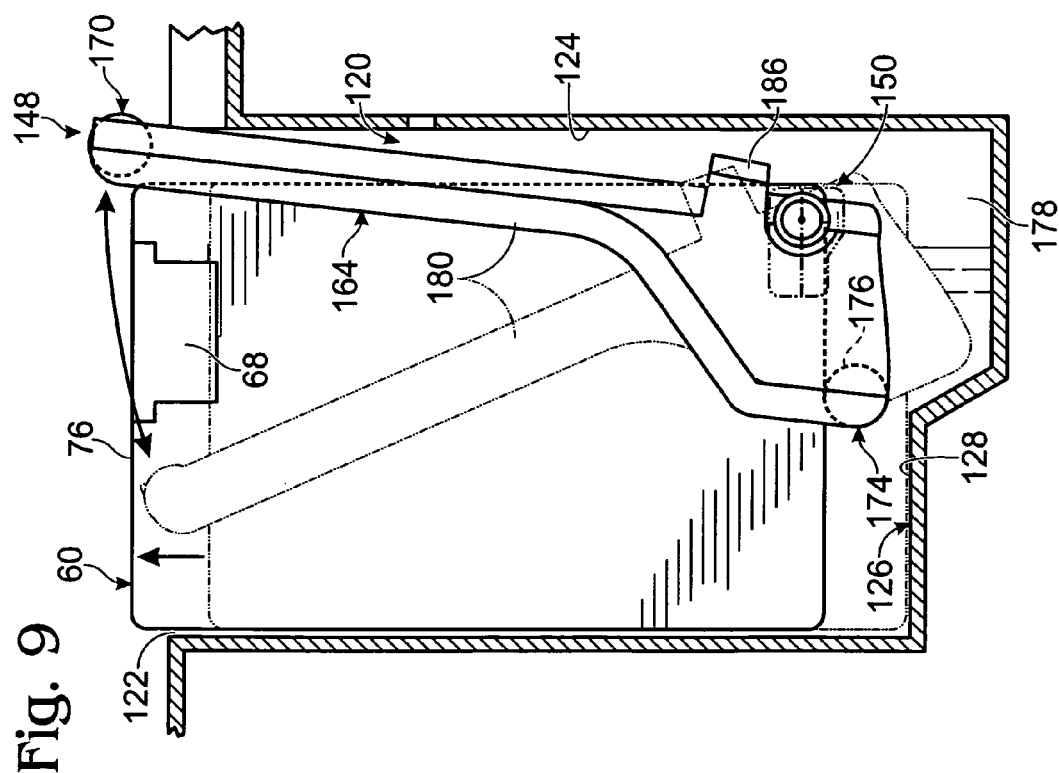

BATTERY RETAINER ASSEMBLY FOR CHILDREN'S RIDE-ON VEHICLES

CROSS-REFERENCE TO RELATED APPLICATION

This application is a continuation-in-part of and claims priority to copending U.S. patent application Ser. No. 10/660,904, which was filed on Sep. 11, 2003, is entitled "Battery Retainer Assembly For Children's Ride-On Vehicles," and the complete disclosure of which is incorporated herein by reference for all purposes.

TECHNICAL FIELD

The present disclosure relates generally to children's ride-on vehicles, and more particularly to battery-powered children's ride-on vehicles and battery retainers for use with such vehicles.

BACKGROUND

Children's ride-on vehicles are reduced-scale vehicles that are designed and sized for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. Typically, the vehicle will include an actuator, such as a foot pedal, push button or other user input device, which enables a child to select when power is delivered to the motor assembly. Some drive assemblies further include other user input devices, such as a speed selector and a direction selector, which are operated by a child sitting on the vehicle's seat to select the speed and direction at which the vehicle travels. The batteries for these vehicles are usually carried within a battery compartment on the vehicle. Typically, the battery compartment is accessible so that the battery may be removed, such as for replacement or charging.

If a battery overturns or becomes displaced within the compartment, the battery and/or the vehicle may be damaged. Thus, it is desirable that the battery is securely held within the compartment. For example, the vehicle typically includes electrical wiring that connects the battery to one or more battery-powered components on the vehicle. An overturned or sliding/moving around battery may damage or displace the wiring, causing an electrical short or other unwanted event. Further, a battery which is not secured within the battery compartment may unintentionally be at least partially, or completely, removed from the compartment, such as if the vehicle is tipped over, strikes an object, etc.

SUMMARY

The present disclosure is directed to battery-powered children's ride-on vehicles having battery retainer assemblies, and to retainer assemblies for use in children's ride-on vehicles. The vehicles include a body with a plurality of wheels, and further include at least one battery-powered component, such as a drive assembly with at least one motor adapted to drive the rotation of at least one of the plurality of wheels. The vehicles also include a battery assembly that is adapted to provide power to the at least one battery-powered component and a battery compartment that is sized to accommodate the battery assembly and receive the battery assembly through an opening in the battery compartment.

The battery retainer assembly includes a retaining member that is coupled relative to the battery compartment and adapted to be selectively moved between a first, or open, position, in which the retaining member is positioned to permit the battery assembly to be inserted into or removed from the battery assembly through the aperture, and a second, or closed, position, in which the retaining member obstructs the removal of the battery assembly from the battery compartment through the opening. In some embodiments, the retaining member is adapted to move or otherwise displace the battery assembly generally toward the aperture as the retaining member is moved from the closed position to the open position. In some embodiments, the retaining member extends at least partially across a proximal surface of the battery when the retaining member is in the closed position. In some embodiments, the retaining member is adapted to automatically move to the closed position upon insertion of the battery assembly into the battery compartment and/or engagement of the retaining member by the battery assembly. In some embodiments, the retaining member (and an inserted battery assembly) are retained in the open position until selectively released therefrom by a user. Upon release, the retaining member may automatically move to the closed position.

BRIEF DESCRIPTION OF THE DRAWINGS

FIG. 3 is a schematic diagram of a suitable drive assembly for the children's ride-on vehicle of FIG. 1.

FIG. 4 is an isometric view of an illustrative battery assembly with illustrative examples of portions of the vehicle's wiring harness and charger shown in fragmentary.

FIG. 7 is a side view of the battery retainer assembly inside the battery compartment of FIG. 1, with the battery retainer assembly in an open position to receive the battery assembly.

FIG. 8 is a side view of the battery retainer assembly shown in FIG. 6, with the battery retainer assembly in a closed position in which it is adapted to retain the battery assembly within the battery compartment.

FIG. 9 is a side view illustrating the position of the battery assembly when the battery retainer assembly is in the closed and the open positions.

FIG. 10 is a side view illustrating another battery retainer assembly according to the present disclosure.

DETAILED DESCRIPTION AND BEST MODE OF THE DISCLOSURE

Figure 1:
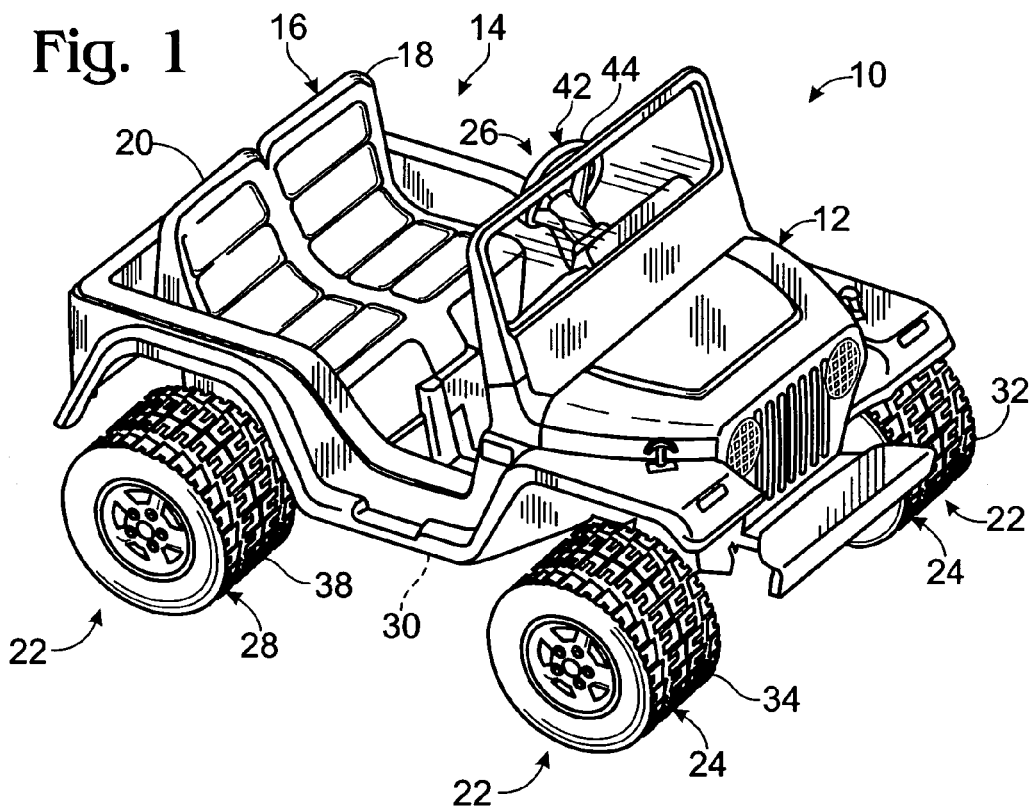
FIG. 1 is an isometric view of a children's ride-on vehicle.

An illustrative example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use either by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale Jeep® vehicle. JEEP is a registered trademark of the Diamler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle having one or more battery-powered components.

Figure 2:
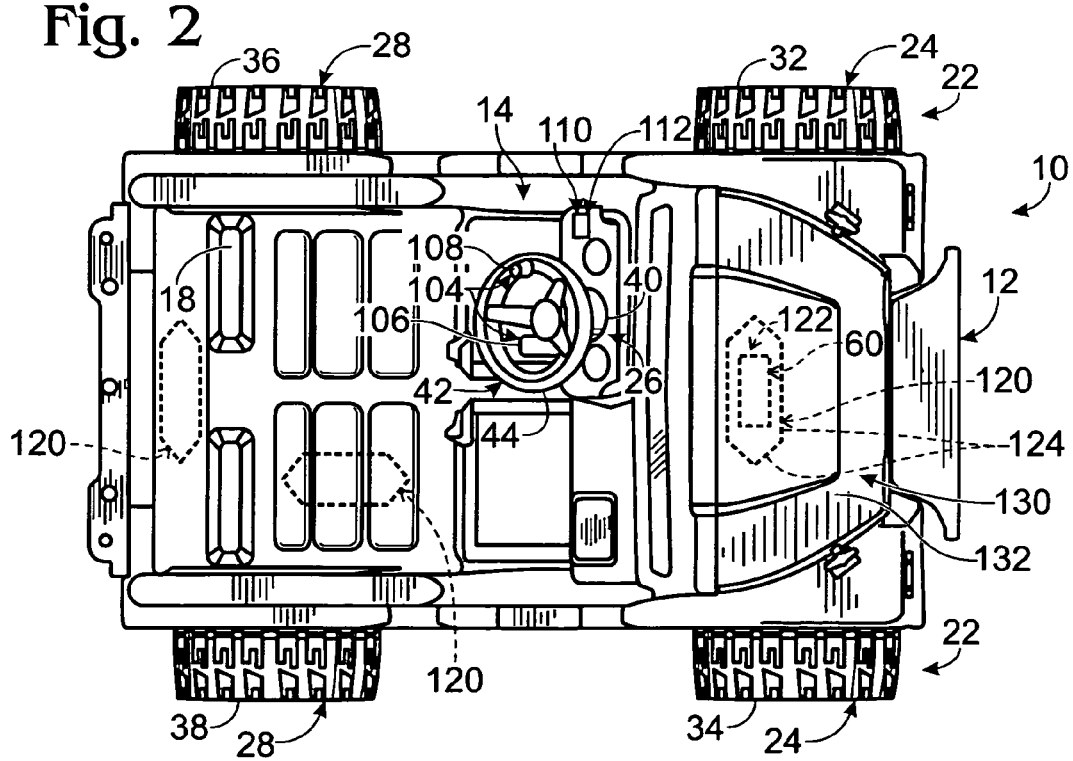
FIG. 2 is a top plan view of the children's ride-on vehicle of FIG. 1, with the vehicle illustrating an example of a suitable placement for a battery assembly and battery compartment.

Body 12 also includes a plurality of wheels 22 that are rotatably coupled to body 12, as indicated in FIGS. 1–2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1 and 2 and includes a steering column 40 and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 40 includes any suitable mechanical linkage that conveys a child's steering inputs from the steering mechanism to the vehicle's steerable wheel assembly, thereby steering the vehicle.

In FIG. 3, an example of a suitable drive assembly 30 for a children's ride-on vehicle, such as vehicle 10, is schematically illustrated. Drive assembly 30 is adapted to drive the rotation of driven wheel assembly 28. The drive assembly includes a motor assembly 46, which includes at least one battery-powered motor 48 that is adapted to drive the rotation of at least one of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly is provided by battery assembly 60. Battery assembly 60 includes at least one battery, or cell, 62 that is adapted to provide power to the motor assembly. Any suitable type and number of batteries may be used in battery assembly 60. Although not required, the batteries are typically rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 to transmit power from the battery assembly to the motor assembly. Thus, the motor assembly is operably connected to the battery assembly by any suitable electrical connectors, such as cables, wires, or positive and negative terminals or leads, and the like. In the exemplary battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to cables 74 that transmit electrical power from the battery assembly to the motor assembly. Vehicle 10 may include any other suitable structure for conducting electrical power from the battery assembly to the motor assembly, with the battery assembly of FIG. 4 merely providing an illustrative example.

The battery assembly typically has a plurality of external surfaces, such as sides 78, a top surface 82, and a bottom surface 84. When properly inserted into the battery compartment of vehicle 10, one of the surfaces will typically generally face the aperture and one of the surfaces will typically face away from the aperture. As used herein, the term "surface" is intended to broadly refer to a region of the battery assembly or the battery compartment, without requiring that the region have smooth or flat configuration. Accordingly, the surfaces referred to herein may optionally be referred to as regions of the corresponding structure, such as a top region, a bottom region, etc. Some battery assemblies and/or battery compartments are sized or otherwise shaped so that the battery assembly may only be inserted into the battery compartment in a certain orientation, or limited number of orientations. Other battery assemblies and/or battery compartments will permit the battery assembly to be inserted in any suitable orientation, with no particular surface of the battery assembly being required to generally face toward or away from the aperture.

As used herein, the term "proximal surface" will be used to refer to the surface of the battery assembly that generally faces and/or is closest to the aperture when the battery assembly is properly installed in the battery compartment, and the term "distal surface" will be used to describe the surface of the battery assembly that generally faces away from the aperture and/or is farthest from the aperture when the battery assembly is properly inserted into the battery compartment. The distal surface typically abuts or otherwise rests against a contact surface (or other distal region of the battery compartment that is generally opposed to the aperture) and/or the subsequently described base portion of the battery retainer assembly after the battery assembly has been properly inserted into the battery compartment. In at least top-load battery compartments, the distal region of the battery compartment forms at least a portion of a support surface that is adapted to engage the distal surface of the battery assembly to at least partially support the battery assembly when the battery assembly is properly inserted into the battery compartment. In side-load battery compartments, the compartment typically includes a support surface that supports a portion other than the distal surface of the battery assembly.

In the context of a battery compartment in which the battery assembly is inserted and removed from the compartment through an aperture in the top of the compartment, top surface 82 will typically be the proximal surface 76 of the battery assembly and bottom surface 84 will typically be the distal surface 80 of the battery assembly, although this configuration is not required. Instead, the terms "proximal surface" and "distal surface" are independent of the configuration of battery assembly 60 and are used merely to clarify relative positioning of the battery assembly and surrounding portions of vehicle 10.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

Drive assembly 30 also includes one or more user input devices 102 that are adapted to convey inputs from a child sitting on seat 18 to the drive assembly. User input devices 102 also may be referred to as user control devices. These devices convey a user's inputs, such as via the vehicle's wiring harness 86, and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Examples of suitable devices 102 include a drive actuator 104, through which a user input directing the battery assembly to energize the motor assembly is received. Examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When drive actuator 104 takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2.

Other examples of user input devices 102 include a speed switch 110, which enables a user to select the relative rate of rotation of the motor assembly's output 50, and a direction switch 112, which enables a user to select the relative direction (i.e., clockwise or counterclockwise) of rotation of output 50 and thereby configure the vehicle to drive in forward and reverse directions. Switches 110 and 112 may be located in any suitable location on body 12 or steering assembly 26 for actuation by a child sitting on seat 18. An example of a suitable speed switch 110 is a switch that selectively configures a pair of batteries between series and parallel configurations to define relative "high" and "low" speed configurations. Speed switch 110 may additionally or alternatively selectively configure a pair of motors between series and parallel configurations.

Drive assembly 30 may (but is not required to) further include a controller 114, which is adapted to control electronically the transmission of the rotational input from the motor assembly to the driven wheel assembly. More specifically, controller 114 includes a microprocessor or suitable control circuit that is adapted to control the actuation, or energization, of the motor assembly by the battery assembly to regulate electronically the rotational input transmitted by the motor assembly to the driven wheel assembly. Controller 114 may regulate at least one of the timing and the ramp, or rate, of application of the transmission of the rotational input after actuation of a corresponding user input device by a child sitting on seat 18. In other words, the controller delays in at least time and/or rate of transmission the rotational input to the driven wheel assembly responsive at least in part to a user input selecting the desired, or selected, rotational input. An illustrative example of a suitable controller is disclosed in U.S. patent application Ser. No. 10/081,934, the complete disclosure of which is hereby incorporated by reference for all purposes.

As shown in FIG. 2, body 12 also includes a battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. As discussed in more detail herein, the battery assembly is supported in the compartment and constrained against unintentional removal from the battery compartment. Typically, battery compartment 120 includes at least one aperture 122, such as illustrated generally in FIG. 2 and in more detail in FIGS. 7–10, that defines an opening through which the battery assembly is inserted into and removed from the battery compartment. The battery compartment is therefore sized to receive the battery assembly through the aperture.

The battery compartment may be disposed at any suitably sized and positioned location of the vehicle, including, but not limited to, beneath the body, within the body, or under the seat assembly. These other illustrative locations for compartment 120 are shown by dashed lines in FIG. 2. In the exemplary embodiment shown in FIG. 2 and subsequently described FIG. 5, the vehicle includes a cover 130 that extends across aperture 122, thereby restricting access to the battery compartment. The cover may protect the battery assembly from exposure, such as to rain or dust. Cover 130 may be permanently coupled to the vehicle's body, such as by a hinged hood 132. Alternatively, cover 130 may be removably coupled to the vehicle's body by any suitable releasable fastener(s).

It is also within the scope of the disclosure that the battery assembly may have a variety of orientations within the battery compartment (such as with a side or even a bottom surface of the battery assembly being closest to, or proximal, the aperture) and/or the battery compartment may be accessed through a side or even a bottom aperture. The surface of the battery assembly that is first passed through the aperture during removal of the battery assembly and/or the surface that is selectively engaged by the retaining portion may be referred to as the proximal surface 76 of the battery assembly, as previously discussed. Similarly, the surface of the battery assembly that is last passed through the aperture during removal of the battery assembly from the battery compartment may be referred to as the distal surface 80 of the battery assembly. For purposes of illustration and clarity of discussion, the proximal and distal surfaces of the battery assembly when the battery assembly is retained in the battery compartment are referred to as the top and bottom surfaces of the battery assembly throughout the exemplary Figures and corresponding description. As discussed above, this correlation is not required.

Figure 5:
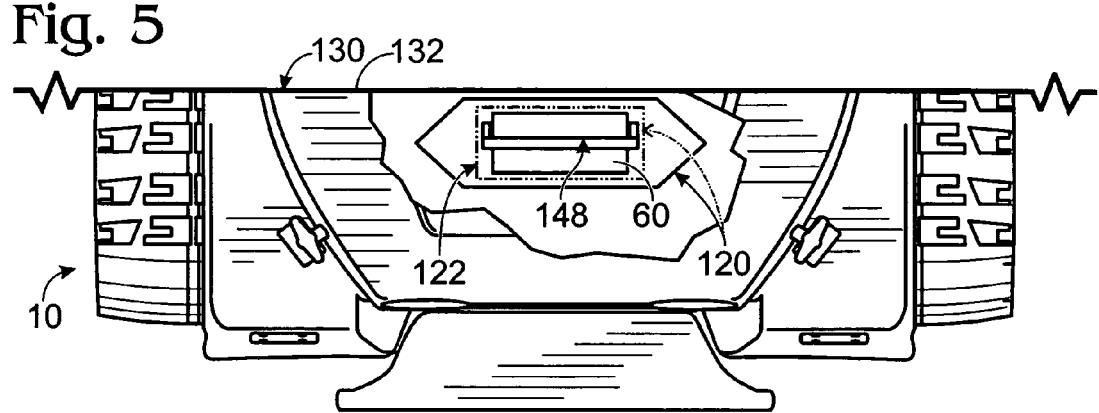
FIG. 5 is a fragmentary top plan view of the vehicle of FIG. 2 including a battery retainer assembly according to the present disclosure.

In FIG. 5, a portion of the illustrative vehicle and battery compartment from FIG. 2 is shown, with the vehicle further including a battery retainer assembly 148 that is adapted to selectively retain the battery assembly within the compartment. As discussed in more detail herein and with reference to the illustrative, non-exclusive embodiments shown in FIGS. 6–20, vehicle 10 includes a battery retainer assembly 148 that is adapted to restrict unintentional removal of the battery assembly from the battery compartment. The battery retainer assembly is coupled to the battery compartment by a coupling assembly 150. The coupling assembly may take any suitable form that defines, guides, or otherwise limits movement of the battery retainer assembly within the battery compartment. Thus, the battery retainer assembly is selectively movable between at least two positions. In at least a first of these positions, the battery retainer assembly is positioned to permit insertion and removal of the battery assembly through aperture 122 into and from the battery compartment. This position may be referred to as an open or unobstructed position of the battery retainer assembly. In at least a second of these positions, the battery retainer assembly is configured to obstruct or otherwise restrict removal of the battery assembly from the battery compartment, such as until the battery retainer assembly is returned to, or at least substantially toward, the open position. This second position may be referred to as a closed or obstructed position. In the following discussion, the open and closed positions of the battery retainer assembly may also be described in the context of the open and closed positions of the components of the battery retainer assembly. Therefore, and for convenience of discussing components of the battery retainer assembly, the depicted components, such as the retaining member, the base portion and/or the retaining portion may be described as having open and closed positions.

As previously noted, the coupling assembly may take any suitable form that defines, guides, or otherwise limits the range of motion of the battery retainer assembly, thereby limiting movement and/or unintentional removal of the battery assembly. Thus, in some embodiments the coupling assembly restricts the battery retainer to rotation about a fixed axis. In other embodiments, the coupling assembly defines a path of travel for the battery retainer assembly that allows for translation, rotation, or combinations thereof, with respect to the battery compartment so that the battery retainer assembly is able to move through a variety of configurations including, but not limited to, the above-discussed open and closed configurations. A portion of the battery retainer assembly may be adapted to slide within the coupling assembly and thereby follow the path of travel. It should be appreciated that the coupling assembly may take a variety of equally suitable forms including a combination of these just described, such as by providing both an axis of rotation for a portion of the battery retainer assembly, and a path of travel for another portion of the battery retainer assembly.

Although not required to all battery retainer assemblies according to the present disclosure, the battery retainer assembly may be adapted to be urged to the second position by engagement of at least a portion of the battery retainer assembly by the battery assembly, such as the application of the battery assembly weight upon the base portion of the retaining member of the battery retainer assembly. The battery retainer assembly also may be adapted to automatically move to the second position upon insertion of the battery assembly into the battery compartment and/or adapted to at least partially displace or otherwise at least partially remove the battery assembly from the battery compartment upon movement of the battery retainer assembly from the second position to, or at least substantially toward, the first position. The battery retainer assembly may be mounted at any suitable location within and/or proximate the battery compartment in which the retainer assembly is positioned to receive the battery assembly and to be selectively moved between the range of positions described herein.

Figure 6:
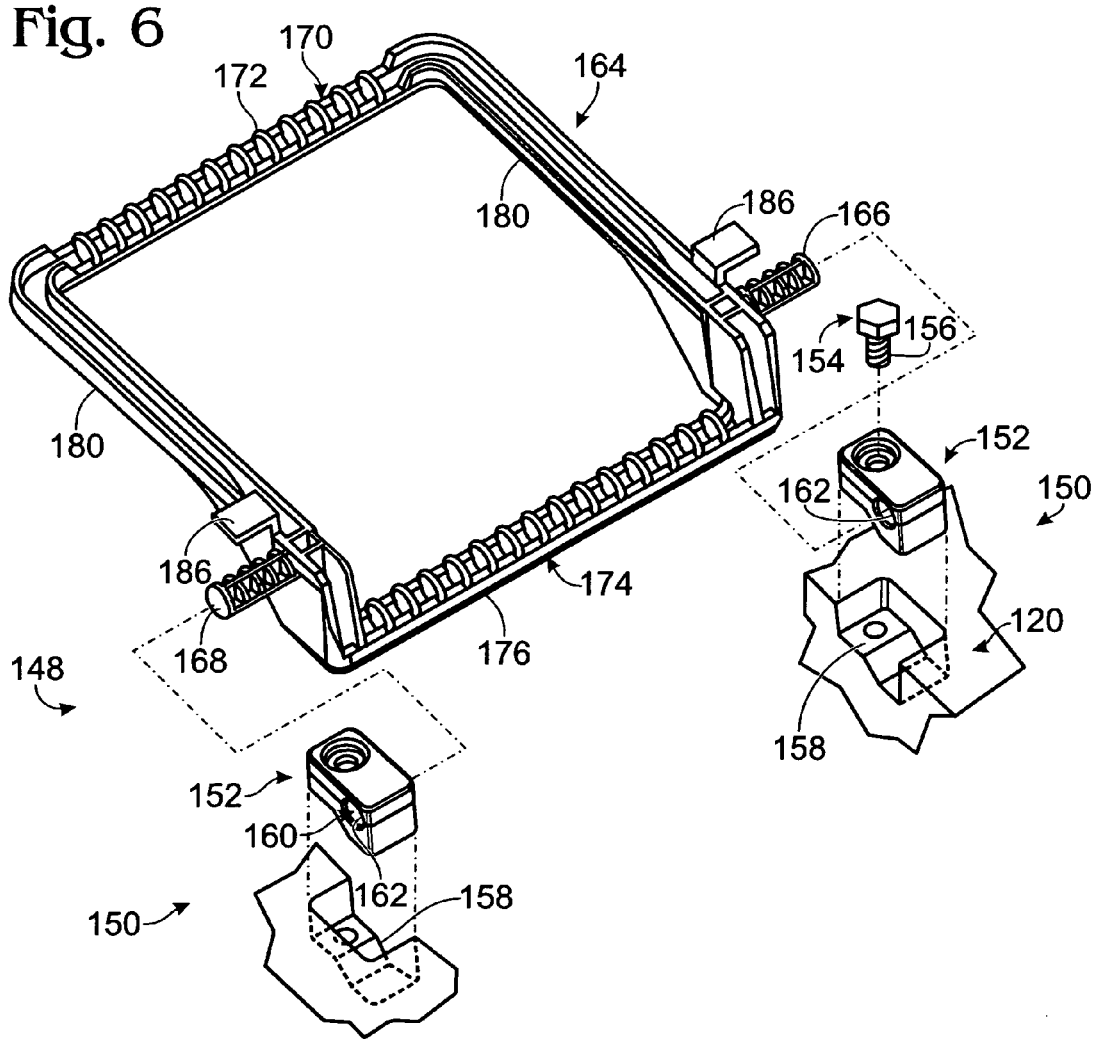
FIG. 6 is an exploded isometric view of an exemplary battery retainer assembly and a coupling assembly.

As previously mentioned, in some embodiments the coupling assembly may restrict movement of the battery retainer assembly to rotation about a fixed axis. In the illustrative embodiment shown in FIG. 6, battery retainer assembly 148 includes a retaining member 164 and a coupling assembly 150. To restrict translation of the battery retainer assembly relative to the battery compartment, coupling assembly 150 may take the form of anchor members 152, which are adapted to couple the retaining member for pivotal movement within the battery compartment. The anchor members may be mounted within and/or proximate the battery compartment using any suitable fasteners 154, such as bolts 156. Other illustrative examples of suitable fasteners include screws, adhesives, clips, etc. In FIG. 6, battery compartment 120 is shown including mounts, or receivers, 158 for the anchor members. However, mounts 158 are not required, with it being within the scope of the disclosure that the anchor members may be coupled to any suitable surface of the battery compartment, such as the sides, the bottom surface, etc. It is also within the scope of the disclosure that the anchor members may be at least partially, or completely, integrally formed with the battery compartment or other portion of the vehicle's body.

As shown in FIG. 6, anchor members 152 include receiving regions 160 that are adapted to receive portions of the retaining member assembly, such as the subsequently described extensions of the retaining member. In the illustrative example shown in FIG. 6, receiving regions 160 are in the form of cylindrical bores 162. Although not required, this configuration enables the anchor members to provide pivotal mounts for the subsequently described retaining member of the battery retainer assembly. Accordingly, this configuration permits the retaining member to be formed as a monolithic structure or to otherwise have a configuration that moves as a unit relative to the anchor members.

At least a portion of battery retainer assembly 148 is selectively positionable to assist in removal of battery assembly 60 from the battery compartment and/or to obstruct removal or other movement of the battery assembly beyond predetermined tolerances. As shown in FIG. 6, battery retainer assembly 148 includes retaining member 164. Retaining member 164 includes extensions, or protrusions, 166 and 168 that are adapted to pivotally mount the retaining member with the anchor members. In the illustrated embodiment, the extensions are pivotally received at least partially into bores 162. Thus, extensions 166 and 168 pivot within bores 162 as the battery retaining member is configured between the open and closed positions. It is within the scope of the disclosure that retaining member 164 may be configured to engage and/or pivot relative to anchor members 152 by any other shape, configuration, or method of coupling.

The illustrative example of a retaining member shown in FIG. 6 also includes a retaining portion, or first member, 170 and a base portion, or second member, 174. Retaining portion 170 is adapted to selectively obstruct or otherwise restrict removal of the battery assembly from the battery compartment when the battery retainer assembly is in the closed position. For example, the retaining portion may be adapted to extend between the battery assembly and the aperture and/or to extend above the aperture in a position whereby removal of the battery assembly therefrom is obstructed until the battery retainer assembly is pivoted to the open position.

In FIG. 7, battery retainer assembly 148 is shown in its open position in a battery compartment 120 with aperture 122. The illustrated example of a battery compartment includes sides 124 and a bottom surface 128 that are generally sized, shaped and arranged to receive battery assembly 60. The sides may take the form of a continuous curved surface, but may also include one or more sidewalls that are separated by corners. The battery compartment preferably includes a support surface, or support structure, 126 that is adapted to support the battery assembly when the battery assembly is inserted into the battery compartment. As discussed in more detail herein, it is also within the scope of the present disclosure that the subsequently described battery retainer assembly may support at least a portion, if not all, of the battery assembly when the battery assembly is received within the battery compartment.

The battery compartment is preferably sized to restrict substantial lateral movement of the battery compartment (in directions transverse to the direction that the battery assembly is inserted and removed from the compartment), although this construction is not required. While the aperture may extend entirely between each side of the exemplary battery compartment to form the upper boundary of the battery compartment, it will be appreciated that aperture 122 may alternatively be smaller in size or otherwise not coextensive with an entire side of the battery compartment and/or may be formed in any one or more sides of the battery compartment. The region of the battery compartment that is generally opposed to the aperture may be referred to as a distal region of the battery compartment. For example, in FIG. 7, the distal region corresponds to surface 128.

As also shown in FIG. 7, in the open position, retaining portion 170 is positioned relative to aperture 122 such that a battery assembly may be selectively inserted into or removed from the compartment through the aperture. In other words, when the battery retainer assembly is in the open position, the retaining portion does not block insertion or removal of the battery assembly through the aperture, with the aperture having sufficient unobstructed space to permit the battery assembly to be inserted into or removed from the battery compartment. In the illustrated example, retaining portion 170 extends proximate and generally above a peripheral portion of the aperture when the battery retainer assembly is in the open position. It is within the scope of the disclosure that retaining portion 170 may have other positions relative to the battery compartment and/or its aperture when the battery retainer assembly is in the open position, so long as the retaining portion does not obstruct the insertion or removal of the battery assembly relative to the battery compartment. For example, in the open position of the battery retainer assembly, at least a portion of the retaining portion may extend within the battery compartment, partially through the aperture, above the battery compartment, outside of the battery compartment, in a laterally displaced position relative to the battery compartment, within a passage in a sidewall of the battery compartment, etc.

In FIG. 8, the battery retainer assembly of FIGS. 6 and 7 is shown in the closed position, in which the assembly is configured to obstruct removal of the battery assembly 60 from the battery compartment. As shown in FIG. 8, battery assembly 60 is positioned within battery compartment 120, with the distal surface 80 of the battery assembly at least partially supported upon a support surface 126 of the battery compartment. In FIG. 8, support surface 126 corresponds to bottom surface 84, although this configuration is not required.

As also illustrated in FIG. 8, in the closed position, retaining portion 170 extends at least partially across proximal surface 76 (such as top surface 82) of the battery assembly, thus sufficiently obstructing aperture 122 to restrict removal of the battery assembly through aperture 122 until the battery retainer assembly is pivoted to its open configuration. Although the illustrative example depicted in FIG. 8 shows the retaining portion in contact with the top surface of the battery assembly, it is within the scope of the disclosure that the retaining portion may be spaced-apart from the top or other proximal surface of the battery assembly when the battery retainer assembly is in the closed position. In other words, positive engagement with the proximal surface of the battery assembly is not required at all times that the battery retainer assembly is in the closed position. While such continuous contact is within the scope of the present disclosure, and in some embodiments may be desired to provide additional restraints against lateral or other movement of the battery assembly within the compartment, merely extending in a position to prevent the unintentional removal of the battery assembly through the aperture is sufficient. In FIG. 8, the subsequently described arms 180 of the retaining member extend on opposed sides of the battery assembly. As such, the illustrated retaining member defines a pivotal frame, or cradle, within which the battery assembly is received, with portions of the retaining member extending above, below, and on opposing sides of the battery assembly. This cage-like, or frame, configuration is not required to all embodiments.

Although the retaining portion shown in FIGS. 6–8 is in the illustrative form of a top crossbar 172, the retaining portion may take a variety of shapes, such as at least one plate, detent, flange, projection, etc. Similarly, and as discussed herein, the retaining portion is not required to selectively engage the top surface of the battery assembly. For example, the retaining portion is more generally adapted to selectively engage a surface of the battery assembly to prevent the unintentional removal of the battery assembly from the battery compartment. This proximal surface may be the surface of the battery assembly that generally faces the aperture when the battery assembly is positioned within the compartment. However, it is also within the scope of the disclosure that the battery assembly may include a projection, such as which extends laterally from the body of the battery assembly, with the retaining portion being adapted to selectively engage this projection to prevent removal of the battery assembly from the compartment.

As discussed, the illustrated retaining member further includes a base portion 174, which is adapted to engage the distal surface 80 (such as bottom surface 84) of the battery assembly at least when the battery retainer assembly is pivoted from the closed position to the open position to remove a battery assembly from the battery compartment. As shown in FIG. 8, this engagement is provided by a bottom crossbar 176, although any other suitable structural member and/or configuration may be used. In FIG. 8, the base portion engages the distal surface of the battery assembly when the battery retainer assembly is in the closed position. However, it is within the scope of the present disclosure that the base portion may not engage the battery assembly when the battery retainer assembly is in the closed position. For example, the base portion may extend in a spaced-apart relationship beneath (or otherwise further away from the aperture) when the retaining member is in the closed position.

As discussed, the support surface of the battery compartment may include the distal region of the compartment. However, it is not required that the entire lower or other surface provides support to the battery assembly. For example, in FIGS. 7 and 8, bottom surface 128 includes a recessed region 178 that is adapted to provide a space into which at least a portion of base portion 174 of the retaining member may extend as the battery retainer assembly is pivoted to the closed position. It is also within the scope of the disclosure that the bottom surface of the battery compartment may be flat, or otherwise not include recessed region 178. In such a configuration, the battery assembly typically remains suspended above the bottom surface, with the battery assembly being supported by the base portion.

When the battery retainer assembly is pivoted from the closed position to the open position, the battery assembly is suspended, elevated, or otherwise displaced by the base portion of the retaining member generally toward the aperture relative to the battery assembly's position when the battery retainer assembly is in the closed position. This is illustrated in FIG. 9, in which illustrative relative positions of the battery retainer assembly and battery assembly are shown, with the closed position shown in dash-dot lines and the open position shown in solid lines. In the illustrated example, the battery assembly is shown in solid lines raised above or otherwise supported in a spaced-apart configuration relative to the distal region (such as the bottom surface) of the battery compartment. As the battery retainer assembly is pivoted to the open position, the base portion imparts an urging force on the battery assembly in a direction that urges the battery assembly toward the aperture. Preferably, this urging force at least partially raises the battery assembly toward, or even out of, the aperture of the battery compartment. For example, the battery retainer assembly may be adapted to displace the battery assembly sufficiently through the aperture and out of the battery compartment for a user to grasp the battery assembly and complete the removal of the battery assembly from the battery compartment.

Although not required, the illustrated curved configuration of bottom crossbar 176 may provide sliding engagement with the battery assembly as the base portion urges the battery assembly toward the aperture. The base portion may additionally or alternatively include other mechanisms to assist in providing smooth motion during pivoting of the retaining member relative to the battery assembly, such as rollers, ball bearings, or the like. A benefit of a battery retainer assembly that selectively urges the battery assembly out of the battery compartment is that a battery retainer assembly having this construction is also adapted to assist in, instead of merely permitting, the intentional removal of the battery assembly from the battery compartment.

It is within the scope of the disclosure that the battery retainer assembly is biased to its open position when not being used to retain a battery assembly. In such a configuration, the biasing may be passively provided, such as by its relative weight distribution of the battery retainer assembly relative to the pivot axis of the assembly, or actively provided, such as by a spring or other suitable structure that urges the battery retainer assembly to its open position. However, it is also within the scope of the disclosure that the battery retainer assembly is not biased to a particular position, or that the assembly is biased to the closed position.

When a battery assembly is inserted into the battery compartment, the battery retainer assembly is initially in the open position, such as previously illustrated and described with respect to FIG. 7. As discussed, the battery retainer assembly may need to be initially pivoted to the open position before the battery assembly may be inserted into the battery compartment, depending for example, upon any biasing of the battery retainer assembly and/or the relative position of the battery retainer assembly when it is desired to insert the battery assembly into the battery compartment. As the battery assembly is inserted into the battery compartment, the distal surface of the battery assembly eventually contacts the base portion of the retaining member. This configuration is shown in FIG. 9.

As the battery assembly is further inserted into the battery compartment, the gravitational and/or other urging force applied to the base member causes the retaining member to pivot to the closed position. As this occurs, the retaining portion is pivoted into an orientation whereby removal of the battery assembly from the compartment is prevented until the battery retainer assembly is returned to, or at least substantially toward, its open position. By this it is meant that it is not required for the retainer assembly to prevent removal of the battery assembly until, and if, the retainer assembly is in its open position. Alternatively, the retainer assembly may be described as having more than one open position, or range of positions, with the terminal ones or extents of these being illustrated herein.

Expressed in other terms, as the retaining member is moved to the closed, or second, position, base portion 174 is moved toward the bottom or other support surface of the compartment and the battery assembly follows. The battery retainer assembly may therefore be described as being adapted to automatically pivot to the closed position upon insertion of the battery assembly into the battery compartment and/or engagement of the base portion of the retaining member by the battery assembly. The illustrated retainer assembly may also be described as being a self-securing battery retainer assembly and/or a battery retainer assembly in which no tools or removal of fasteners is required to configure the assembly to its closed, or battery-retaining, position. As discussed in more detail herein, it is also within the scope of the present disclosure for the retainer assembly to be selectively retained in the open position, such as by at least one detent or releasable member. In such an embodiment, the retainer assembly preferably is adapted to automatically pivot, slide or otherwise move to the second position upon release of the retainer assembly from the detent or other structure retaining it in the first position.

As discussed, it is not required for the base portion or the retaining portion of the battery assembly to physically contact the battery assembly when the battery retainer assembly is in the closed position. Accordingly, it is within the scope of the disclosure that a battery retainer assembly may provide the functionality described herein and include base and/or retaining portions that extend in spaced-apart configurations relative to the battery assembly when the battery retainer assembly is in the closed position. An illustrative example of such a battery retainer assembly is shown in FIG. 10.

In the illustrative embodiments shown in FIGS. 6–10, movement of base portion 174 is essentially coupled by gravity as the battery assembly is inserted into contact therewith. Lowering the battery assembly against the base portion actuates the base to pivot the retaining member from its open position to its closed position. As a result of this coupled motion, moving retaining member 164 from its closed position to its open position causes the base portion to urge, and at least partially raise, the battery assembly out of the battery compartment and/or toward aperture 122, thus assisting in removal of the battery assembly from the compartment. Furthermore, the weight of the battery assembly itself actuates the pivotal movement of the battery retainer assembly that retains the battery assembly within the compartment. When battery retainer assembly 148 and battery compartment 120 have configurations in which the battery compartment is accessed through a lateral opening, a similar relationship exists between the base portion, the retaining portion and the battery assembly, except that the pivoting of the battery retainer assembly to the closed position is driven by user-applied forces that urge the battery assembly into the battery compartment.

The base portion and the retaining portion of retaining member 164 are typically coupled so that they move in tandem when the retaining member is pivoted between the first and second positions. Thus when the retaining portion is pivoted away from a position in which removal of the battery assembly is restricted, the base portion raises the battery assembly. In FIGS. 6–9, the base and retaining portions of the retaining member are joined by a pair of spaced-apart arms 180. It is within the scope of the disclosure that any suitable connecting structure may be utilized to connect the base and retaining portions and provide the functionality described herein. When arms 180 are utilized, the arms may extend along lateral sides of the battery assembly when the battery assembly is retained in the battery compartment, thereby themselves providing stabilizing members for the battery assembly. However, it is also within the scope of the disclosure that the arms may extend in any other suitable position relative to the battery assembly and/or that a fewer or greater number of arms or other connecting structure may be utilized.

In the illustrative examples shown in FIGS. 6–9, the base portion, retaining portion, and arms form a coupled rectangular unit. However, this configuration is not required, and the retaining member may take any form suitable for selectively retaining the battery assembly within the battery compartment and/or assisting in the removal of the battery assembly therefrom. In the illustrative example, the base and retaining portions are adapted to move as a unit. However, it is also within the scope of the disclosure that the base portion and the retaining portion may be adapted to move separately. For example, in such a configuration, the base portion and the retaining portion may have separate arms connecting them to extensions 166 and 168. Thus, extensions 166 and 168 may be configured to move retaining portion 170 and base portion 174 independently and the extensions may therefore optionally be telescoping with one another to save space by using the same bores 162.

The battery compartment may be substantially larger than battery assembly 60. Thus, the sides of the battery compartment may not sufficiently support the battery assembly against lateral movement within the battery compartment. Therefore, the battery compartment may further include one or more projecting supports, ribs, protrusions, or other similar stabilizing members 182 that may extend from sides 124 and/or bottom surface 128 of the battery compartment and which are positioned to extend proximate or in contact with one or more sides of the battery assembly. A graphical depiction of an illustrative stabilizing member is provided in FIG. 7. The stabilizing members are adapted to restrict lateral movement of battery assembly 60 within battery compartment 120. For example, the battery assembly may therefore rest against the bottom or other support surface of the battery compartment between at least a pair of the stabilizing members and/or between a stabilizing member and a side of the battery compartment.

When the battery retainer assembly is configured to urge the battery assembly sufficiently out of the compartment for a user to readily grasp the battery assembly and complete the removal of the battery assembly from the compartment, this configuration also enables (but does not require) that the battery compartment may be constructed to closely conform to the size of the battery assembly. In other words, when it is not required for the battery compartment to have sufficient room or open space between its sides and the battery assembly for a user's hands to reach into this space to grasp the battery assembly, the compartment may be sized to closely conform to the size of the battery assembly. Accordingly, lateral movement or shifting of the battery assembly within the compartment is restricted by the sides, or sidewalls, of the battery compartment and the overall size of the battery compartment is reduced. An illustrative battery compartment that is sized to closely conform to the size of the corresponding battery assembly is shown in dash-dot lines in FIG. 5.

To urge the retaining member from the closed position to the open position, a user may simply push or pull upon the retaining portion of the retaining member to urge the retaining member to the open position. However, in some embodiments, it may be desirable to provide a handle around which a user's hand (or fingers) may extend. Therefore, in contrast to structure that may be engaged by a user's hand, the terms "handle" and "handle assembly" refer to structure that is configured to be grasped within a portion of the user's hand. When the retaining portion extends sufficiently above the proximal surface of the battery assembly while the battery retainer assembly is in the closed position, the retaining portion may itself provide a handle, or handle assembly, for the battery retainer assembly. However, and as discussed, in many embodiments, it may be desirable for the retaining portion to extend in contact or in close proximity to the proximal surface of the battery assembly when the battery retainer assembly is in the closed position.

Figure 11:
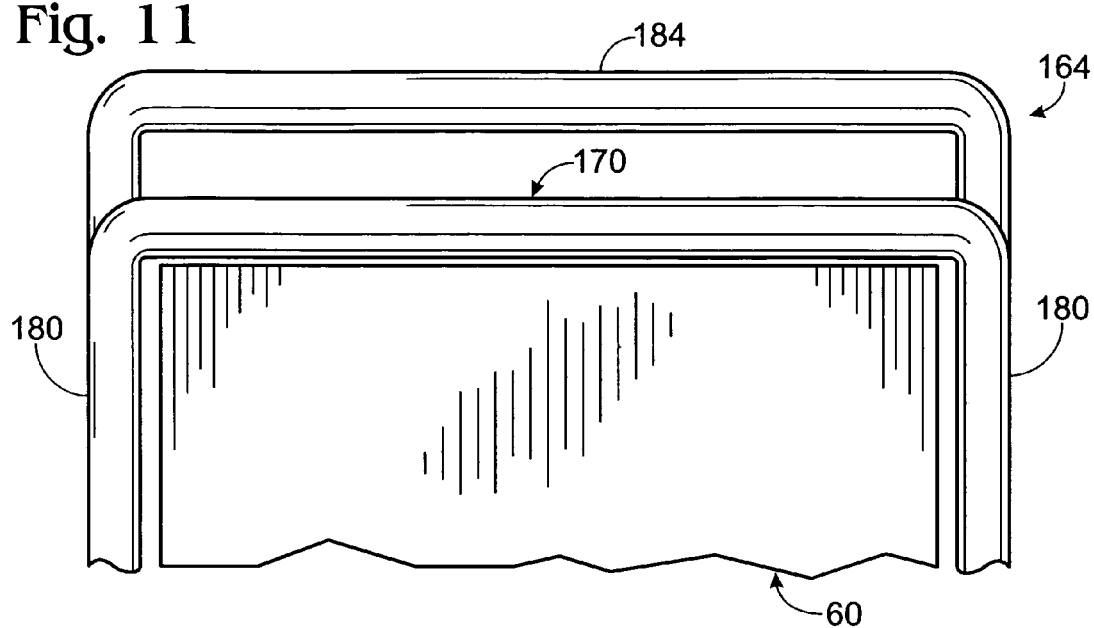
FIG. 11 is a fragmentary front elevation view of an illustrative handle assembly for the battery retainer assembly.
Figure 12:
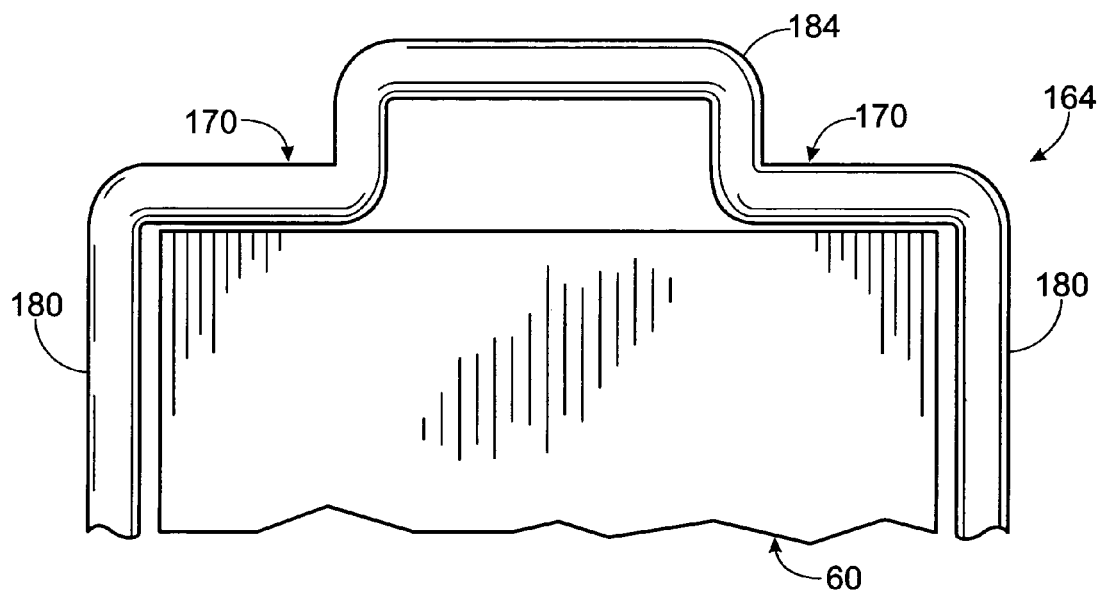
FIG. 12 is a fragmentary front elevation view of another illustrative handle assembly for the battery retainer assembly.

Illustrative examples of retaining members that include handles, or handle assemblies, are shown in FIGS. 11 and 12, with the handles being generally indicated at 184. The handle assembly may be integrally or separately formed with other portions of the retaining member. Similarly, the handle assembly may extend from any suitable location on the retaining member, such as from the retaining portion, arms, etc. It is within the scope of the disclosure that the handle may otherwise not be a functional component of the battery retainer assembly. It is also within the scope of the disclosure that battery retainer assemblies be formed without a handle.

In FIGS. 7–10, retaining member 164 is shown including optional guards 186 that restrict movement of the retaining member relative to sides 124 of the battery compartment. The guards are adapted to engage the sides of the battery compartment to prevent further pivoting of the retaining member. This prevents a user from over-pivoting the retaining member and/or potentially damaging the handle 184, or any other region of the retaining member that extends beyond the battery compartment, by applying excessive force on the retaining member against the edge of the battery compartment. The guards may include a resilient, or shock-absorbing, material, such as foam or rubber, to cushion the engagement of the guards and the walls or other portion of the battery compartment.

Figure 13:
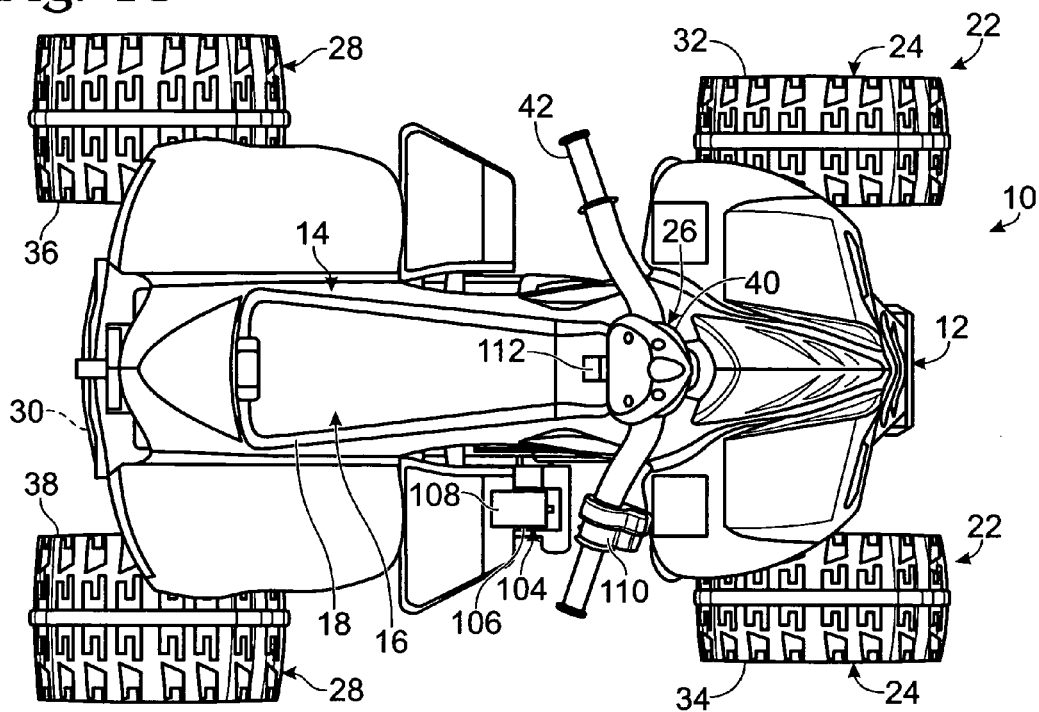
FIG. 13 is a top plan view of another example of a children's ride-on vehicle.

Another illustrative example of a suitable structure for ride-on vehicle 10 is shown in FIG. 13. As shown, the ride-on vehicle is shaped to generally resemble a reduced-scale all-terrain, or "quad," vehicle. Similar to the previously discussed example, ride-on vehicle 10 includes a support frame, or body, 12 that provides a riding space, or passenger compartment, 14 with a seat assembly 16 that is sized and configured to accommodate at least one child. In the illustrated embodiment, seat assembly 16 includes a seat, or seating region, 18 sized and positioned to receive a child driver. Body 12 also includes a plurality of wheels 22 that are rotatably coupled to the body. The plurality of wheels includes a steerable wheel assembly 24 that contains at least one steerable wheel that is adapted to be steered by the vehicle's steering assembly 26, at least partially in reponse to user-imparted steering inputs thereto. The plurality of wheels further includes a driven wheel assembly 28 that contains at least one driven wheel that is adapted to be rotationally driven by the vehicle's drive assembly 30. In the illustrated embodiment, vehicle 10 includes four wheels 22, with front wheels 32 and 34 forming steerable wheel assembly 24, and rear wheels 36 and 38 forming driven wheel assembly 28.

As shown in FIG. 13, steering assembly 26 includes a steering column 40 and a steering mechanism 42. In the illustrated embodiment, steering mechanism 42 takes the form of handlebars. Also as previously discussed, the vehicle's drive assembly includes one or more user input devices that are adapted to convey inputs from a child sitting on seat 18 to the drive assembly. In the embodiment shown in FIG. 13, the user input devices include a drive actuator 104 shown in the form of a foot pedal 106, which may include an on/off switch 108. A speed switch 110 and a direction switch 112 may also be provided.

Figure 14:
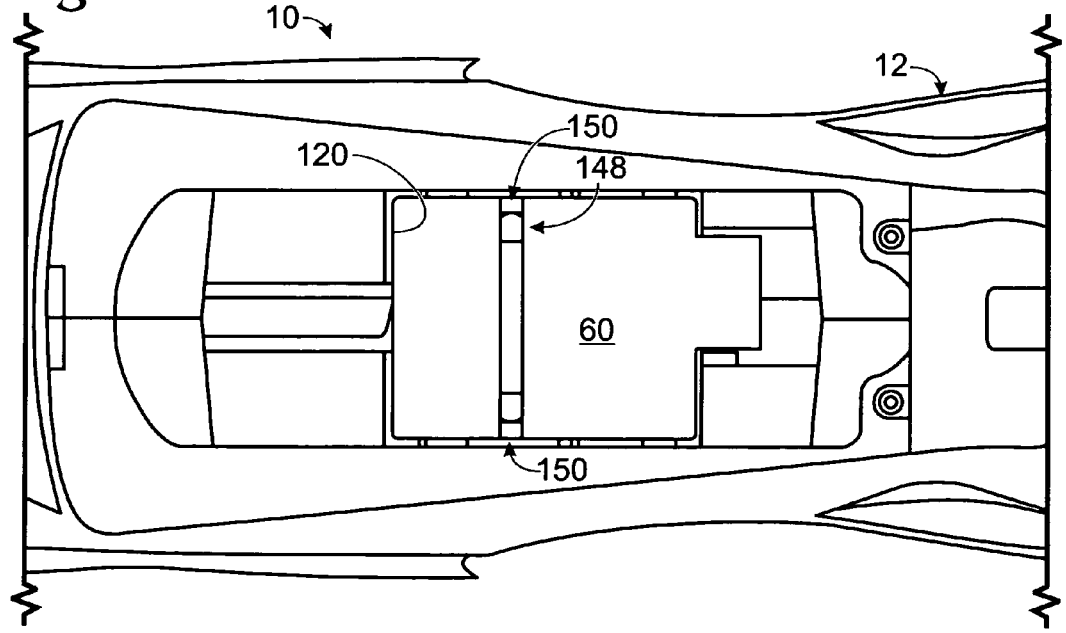
FIG. 14 is a fragmentary top plan view of the vehicle of FIG. 13 including another battery retainer assembly according to the present disclosure.

A portion of the illustrative vehicle and battery compartment from FIG. 13 is shown in FIG. 14. Body 12 further includes a battery compartment 120 that is adapted to receive battery assembly 60. As previously noted, the battery assembly is supported in the compartment and constrained against unintentional removal from the battery compartment by a battery retainer assembly 148. Retainer assembly 148 is coupled to the battery compartment by a coupling assembly 150.

Figure 15:
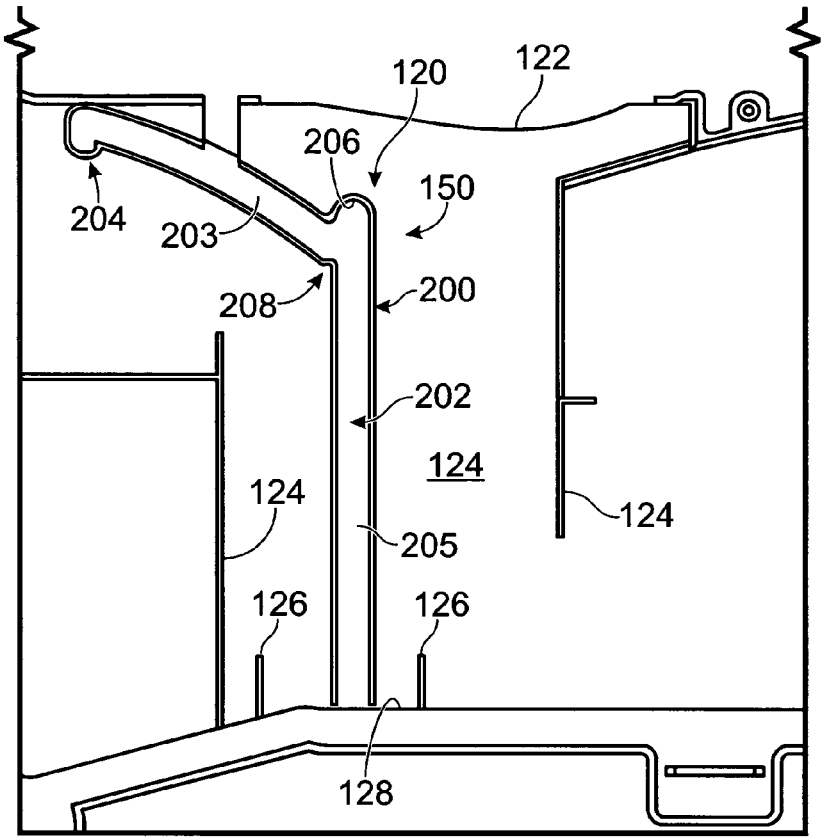
FIG. 15 is a fragmentary, cross-sectional side view of an exemplary battery compartment for the vehicle of FIG. 13 and including a coupling assembly.

In the illustrative embodiment shown in FIG. 15, coupling assembly 150 takes the form of track members 200, which are integrally formed with the battery compartment. In some embodiments, the track members may be separate components that mount within and/or proximate the battery compartment, similar to that shown and described with reference to the embodiment of FIG. 6. In the illustrative example shown in FIG. 15, channels 202 are formed in track members 200 and define at least one path of travel for the retaining member. A portion of channels 202 may be angled relative to the rest of the channels and/or may be arcuate in shape. However, it is also within the scope of the disclosure that the channels may be individually formed and/or spaced in any other suitable position relative to one another so that the channels provide sliding engagement with at least a portion of retaining member 164. Thus, channels 202 may form a continuous arc or may be substantially perpendicular to one another. In the embodiment shown in FIG. 15, channels 202 include an arcuate portion 203, which allows rotation and translation of the retaining member relative to the battery compartment, and a substantially straight portion, which allows further translation of the retaining member relative to the battery compartment.

In some embodiments, channels 202 may further include detents 204 that restrict movement of the retaining member along the channels. As shown, the detents may be located at an end region of the channels. Alternatively or additionally, there may be two or more detents located at intervals along the channels. Detents 204 may take any suitable form for selectively retaining the retainer assembly in a selected position, such as the first position, until the battery assembly is inserted into contact with the retainer assembly, or thereafter. Illustrative, nonexclusive examples of suitable forms for detents 204 include wells, depressing latches, raised portions, teeth, projections, clasps, clips, etc. The battery retainer assembly may thereby be maintained in an open position despite the weight of the battery urging the retainer assembly to the closed position. A user may then have both hands free to remove the battery from the battery compartment. The retaining member may be adapted to automatically move to the second or closed position upon disengagement of the retaining member from the detents. In some embodiments, the retaining member is disengaged from the detents by moving the retaining member generally toward the aperture of the battery compartment. It should also be appreciated that the track members and/or the detents may be positioned on any opposed sidewall(s) or on other opposing portions of the battery compartment or structure adjacent this compartment.

As previously noted, if a battery overturns or becomes displaced within the compartment, or if the vehicle overturns, the battery and/or the vehicle may be damaged. To assist in securing the battery within the compartment, channels 202 may include grooves 206 that further limit movement of the retaining member within the channels. Grooves 206 may also be referred to as inversion detents, as they are adapted to restrict motion of the retaining member (and battery assembly) when the member and assembly are unintentionally urged out of the compartment, such as if the vehicle hits a severe bump, is inverted, tips over, etc. For example, should the battery assembly become displaced away from the distal region of the battery compartment, the retaining member is adapted to slide into grooves 206 instead of continuing along the channels to the open position. Thus, battery assembly 60 is restricted from exiting the battery compartment by movement of the retaining member to an intermediate position in which the base portion is spaced away from the distal region of the battery compartment and the retaining portion obstructs removal of the battery assembly from the battery compartment. To further encourage movement of the retaining member into grooves 206, guides 207 may be located proximate to the arcuate portion of channels 202 to urge the retaining member into the grooves. It should be appreciated that guides 207 do not restrict movement of the retaining member from the open position to the closed position as the weight of the battery is sufficient to move the retaining member past guides 207. Additionally, guides 207 do not restrict movement of the retaining member from the closed position to the open position when a user pulls the retaining member along the channels 202 toward the open position. In some embodiments, sidewalls 124 of the battery compartment are adapted to restrict movement of the battery assembly within the battery compartment to translation into and out of the battery compartment.

Figure 16:
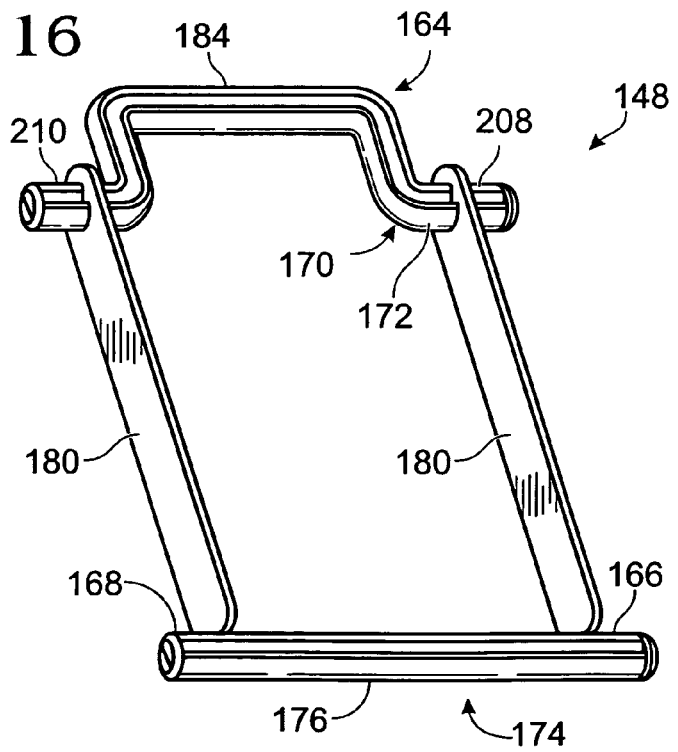
FIG. 16 is an isometric view of another exemplary battery retainer assembly adapted for use with the coupling assembly of FIG. 15.
Figure 17:
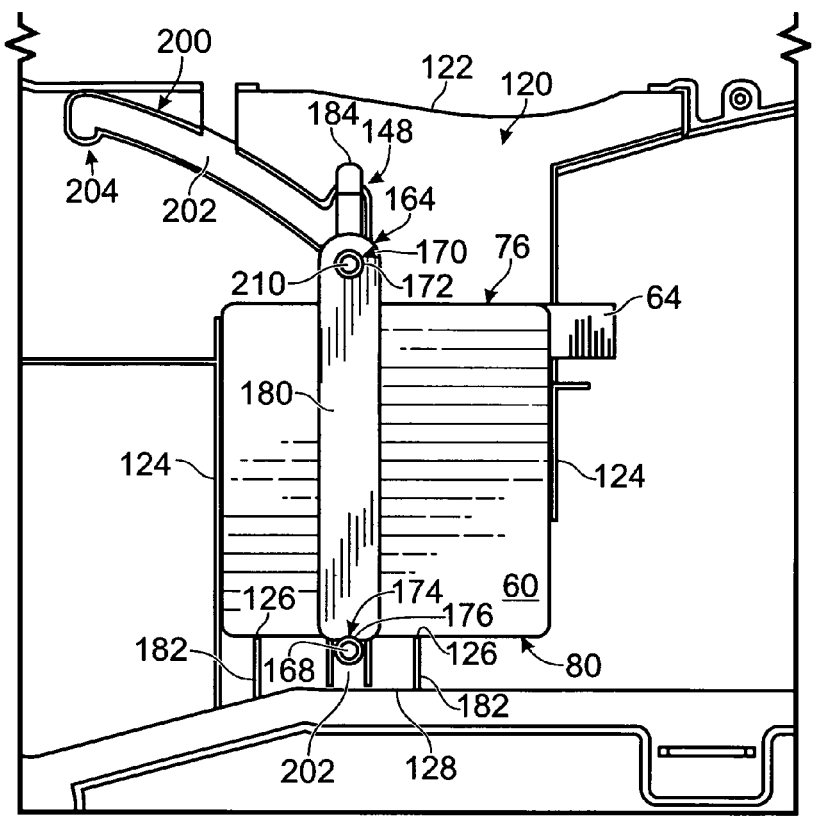
FIG. 17 is a fragmentary cross-sectional side view illustrating the position of the battery assembly when the battery retainer assembly is in the closed position.

As shown in FIG. 16, retaining member 164 includes protrusions 208 and 210, in addition to the previously mentioned protrusions 166 and 168. The channels, shown in FIG. 15, guide movement of retaining member 164 along an arcuate path for protrusions 208 and 210 and a generally straight path for protrusions 166 and 168. Thus, retaining member 164 is adapted to rotate and translate within the battery compartment. As previously discussed, base portion 174 is coupled to retaining portion 170 by a pair of spaced-apart arms 180. Thus, the base portion and retaining portion move in tandem when the retaining member is moved between the first and second positions. Although channels 202 are shown as providing continuous paths of travel for all the protrusions, it is within the scope of the disclosure that the channels may be individually formed. For example, in some embodiments a channel may form an oblong bore for protrusions 166 and 168 and a separate channel may form an arcuate path for travel of protrusions 208 and 210. Handle assembly 184 allows a user to more easily push or pull the retaining member to the open position. In such a configuration, the retaining portion 170 may contact at least a portion of the proximal surface of the battery assembly when the retaining member is in the closed position while allowing sufficient space for a user's hand. In FIG. 17, the battery retainer assembly of FIG. 16 is shown engaged with the coupling assembly of FIG. 15 and configured in the closed position. As shown in FIG. 17, battery assembly 60 is positioned within battery compartment 120, with the distal surface 80 of the battery assembly at least partially supported upon a support surface 126 of the battery compartment. As also illustrated in FIG. 17, in the closed position, retaining portion 170 extends at least partially across proximal surface 76 of the battery assembly, thus sufficiently obstructing aperture 122 to restrict removal of the battery assembly through aperture 122 until the battery retainer assembly is moved to, or at least substantially toward, its open position.

Figure 18:
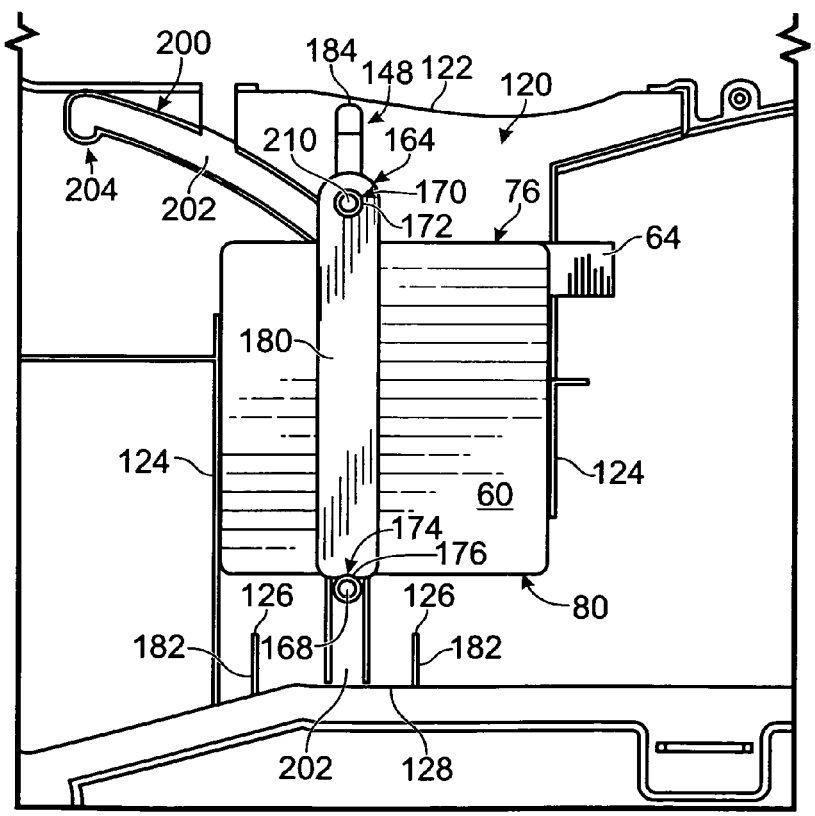
FIG. 18 is a fragmentary, cross-sectional side view illustrating the position of the battery assembly when the battery retainer assembly is in an intermediate position.
Figure 19:
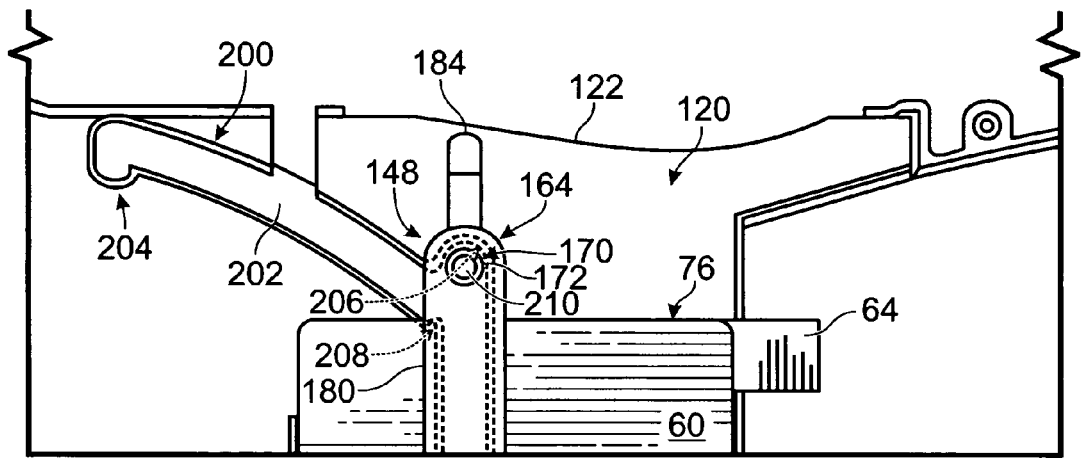
FIG. 19 is a fragmentary, cross-sectional side view of the intermediate position of FIG. 18.

FIG. 18 illustrates the retaining member and battery assembly in an intermediate position in which the base portion is spaced away from the distal region of the battery compartment and the retaining portion obstructs removal of the battery assembly from the battery compartment. As depicted, the intermediate position is directly above the second position, although such a configuration is not required. The intermediate position is shown in more detail in FIG. 19, in which the protrusions are within grooves 206.

Figure 20:
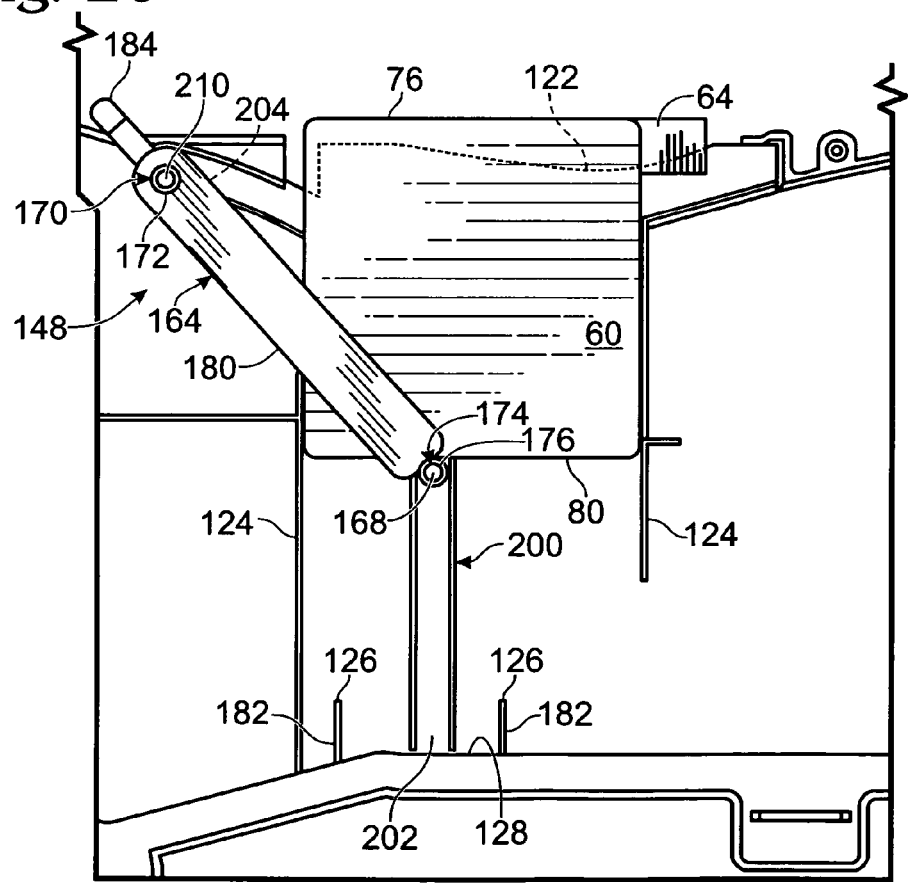
FIG. 20 is a fragmentary, cross-sectional side view illustrating the position of the battery assembly when the battery retainer assembly is retained in the open position.

To urge the retaining member from the closed position to the open position, a user may push or pull upon the retaining portion or handle of the retaining member to urge the retaining member to the open position, as shown in FIG. 20. The user may then position the retaining member to selectively engage with detents 204. Due to its coupled motion, moving retaining member 164 from its closed position to its open position causes the base portion to urge, and at least partially raise, the battery assembly toward, or even out of, aperture 122, thus assisting in removal of the battery assembly from the compartment. For example, the battery retainer assembly may be adapted to displace the battery assembly sufficiently through the aperture and out of the battery compartment for a user to grasp the battery assembly and complete the removal of the battery assembly from the battery compartment. In some embodiments, the retaining portion and/or the handle may extend out of the battery compartment sufficiently far to preclude closing a cover of the battery compartment (such as the seat) when the retaining member is in the open position. The vehicle would thus not be operable until the retaining member was moved to the closed position, thereby securing the battery assembly fully within the battery compartment.

To secure the battery assembly within the battery compartment, FIGS. 17 and 20 are performed in reverse. The retaining member may be (but is not required to be) initially retained in the open position, such as by placing the protrusions within the detents, while the battery assembly is placed on the base portion of the retaining member. If so, the retaining member may then be disengaged from the detent(s) or other retaining structure. In the illustrated embodiment, the retaining member may then be moved generally toward the aperture of the battery compartment to disengage the retaining member from the detents. Other detents or retaining structure may be disengaged via different motions or mechanisms. Once disengaged, the retaining member automatically moves to the closed position due to the weight of the battery.

While illustrative examples of battery retainer assemblies according to the present disclosure have been illustrated in FIGS. 6–20, the battery retainer assemblies may take a wide variety of other forms, as desired or beneficial for a particular application, without departing from the scope of the present disclosure.

INDUSTRIAL APPLICABILITY

The present invention is applicable to any battery-powered children's ride-on vehicles, and especially to children's ride-on vehicles with battery-powered motor assemblies.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and subcombinations of features, functions, elements and/or properties may be claimed through amendment of the present claims or presentation of new claims in this or a related application. Such amended or new claims, whether they are directed to a different invention of directed to the same invention, whether different, broader, narrower or equal in scope to the original claims, are also regarded as included within the subject matter of the inventions of the present disclosure.

I claim:

1. A children's ride-on vehicle, comprising:
a body having at least one seat for a child and a battery compartment adapted to receive a battery assembly, wherein the battery compartment includes an aperture sized to permit a battery assembly to be selectively inserted into and removed from the battery compartment, and further wherein the battery compartment includes a distal region that is spaced apart from the aperture;
a battery-powered motor assembly;
at least one user input device adapted to actuate the battery-powered motor assembly;
a steering assembly including a steering mechanism adapted to receive steering inputs from a child sitting on the at least one seat;
a plurality of wheels rotatably coupled to the body, wherein the plurality of wheels includes at least one driven wheel adapted to be rotationally driven by the battery-powered motor assembly and at least one steerable wheel adapted to receive steering inputs from the steering assembly;
a battery assembly adapted to provide power to the battery-powered motor assembly; and
a battery retainer assembly adapted to selectively retain the battery assembly within the battery compartment, the battery retainer assembly comprising:
a retaining member comprising:
a base portion adapted to selectively engage a distal surface of the battery assembly; and
a retaining portion coupled to the base portion and adapted to selectively obstruct removal of the battery assembly from the battery compartment through the aperture, wherein the retaining member is adapted to be selectively moved between at least a first position, in which the base portion extends generally between the aperture and the distal region of the battery compartment and the retaining portion is positioned to permit the battery assembly to be removed from the battery compartment through the aperture, and a second position, in which the base portion is moved generally away from the aperture relative to the first position and the retaining portion is positioned to obstruct removal of the battery assembly from the battery compartment through the aperture.

2. The children's ride-on vehicle of claim 1, wherein the base portion is adapted to displace the battery assembly away from the distal region of the battery compartment when the retaining member is moved from the second position to the first position.

3. The children's ride-on vehicle of claim 2, wherein in the first position, the base portion is adapted to displace the battery assembly sufficiently away from the distal region of the battery compartment for a portion of the battery assembly to extend through the aperture and out of the battery compartment.

4. The children's ride-on vehicle of claim 2, wherein the battery assembly includes a proximal surface that generally faces the aperture when the battery assembly is inserted into the battery compartment and the retaining member is in the second position, and further wherein in the second position, the retaining portion is adapted to extend across at least a portion of the proximal surface of the battery assembly.

5. The children's ride-on vehicle of claim 4, wherein in the second position, the retaining portion is adapted to engage the proximal surface of the battery assembly.

6. The children's ride-on vehicle of claim 4, wherein in the second position, the retaining portion is adapted to extend in a spaced-apart relationship with the proximal surface of the battery assembly.

7. The children's ride-on vehicle of claim 4, wherein the retaining portion is coupled to the base portion by a pair of arms that respectively extend along opposed sides of the battery assembly when the battery assembly is inserted into the battery compartment and the retaining member is in the second position.

8. The children's ride-on vehicle of claim 1, wherein the retaining member includes a handle adapted to be selectively grasped by a user to move the retaining member between the first position and the second position.

9. The children's ride-on vehicle of claim 8, wherein the handle projects from the retaining portion.

10. The children's ride-on vehicle of claim 8, wherein in at least the first position, at least a portion of the handle extends through the aperture and out of the battery compartment.

11. The children's ride-on vehicle of claim 1, further including a coupling assembly adapted to couple the retaining member relative to the battery compartment, wherein the coupling assembly is adapted to define a path of travel for the retaining member between at least the first position and the second position.

12. The children's ride-on vehicle of claim 11, wherein the coupling assembly is integrally formed with the battery compartment.

13. The children's ride-on vehicle of claim 11, wherein the coupling assembly includes track members that define the path of travel for the retaining member between at least the first and second positions.

14. The children's ride-on vehicle of claim 13, wherein the path of travel is defined by channels in the track members, within which portions of the retaining member travel.

15. The children's ride-on vehicle of claim 14, wherein the retaining member further includes protrusions adapted to slidably travel within the channels as the retaining member is configured between at least the first position and the second position.

16. The children's ride-on vehicle of claim 11, wherein the coupling assembly includes at least one detent adapted to retain the retaining member in at least the first position.

17. The children's ride-on vehicle of claim 16, wherein the retaining member is adapted to automatically move to the second position upon disengagement of the retaining member from the at least one detent.

18. The children's ride-on vehicle of claim 17, wherein the retaining member is adapted to be disengaged from the at least one detent by movement of the retaining member generally toward the aperture of the battery compartment.

19. The children's ride-on vehicle of claim 1, wherein the retaining member is further adapted to be selectively moved to an intermediate position in which the base portion is spaced away from the distal region of the battery compartment and the retaining portion obstructs removal of the battery assembly from the battery compartment.

20. The children's ride-on vehicle of claim 19, wherein the intermediate position is above the second position.

21. The children's ride-on vehicle of claim 1, wherein the battery compartment is sized to provide insufficient clearance for a user's hand to extend between the battery assembly and the battery compartment and remove the battery assembly from the battery compartment.

22. The children's ride-on vehicle of claim 1, wherein the base portion and the retaining portion are adapted to move as a unit relative to the battery compartment.

23. The children's ride-on vehicle of claim 22, wherein the base portion and the retaining portion are integrally formed with each other.

24. The children's ride-on vehicle of claim 1, wherein the battery retainer assembly is adapted to selectively retain the retaining member in the first position.

25. The children's ride-on vehicle of claim 24, further including a coupling assembly adapted to couple the retaining member relative to the battery compartment and define a path of travel for the retaining member, wherein the coupling assembly includes at least one detent adapted to retain the retaining member in the first position.

26. The children's ride-on vehicle of claim 25, wherein the retaining member is adapted to automatically move to the second position upon disengagement from the at least one detent.

27. The children's ride-on vehicle of claim 1, wherein the vehicle further comprises a removable cover that is adapted to extend over the aperture to prevent access to the battery compartment.

28. A children's ride-on vehicle having at least a first battery-powered component, the vehicle comprising:
  a body having at least one seat for a child and a battery compartment adapted to receive a battery assembly, wherein the battery compartment includes an aperture sized to permit a battery assembly to be selectively inserted into and removed from the battery compartment;
  a battery-powered motor assembly;
  at least one user input device adapted to actuate the battery-powered motor assembly;
  a plurality of wheels rotatably coupled to the body;
  a battery assembly adapted to provide power to the battery-powered motor assembly; and
  a battery retainer assembly adapted to selectively retain the battery assembly within the battery compartment, the battery retainer assembly comprising a retaining member coupled for pivotal movement relative to the battery assembly, wherein the retaining member is adapted to be moved between a closed position, in which the retaining member obstructs removal of the battery assembly from the battery compartment through the aperture, and an open position, in which the retaining member does not obstruct removal of the battery assembly from the battery compartment through the aperture and in which the retaining member is adapted to displace the battery assembly at least partially through the aperture.

29. The children's ride-on vehicle of claim 28, wherein the battery assembly includes a proximal surface that generally faces the aperture when the battery assembly is inserted into the battery compartment and the retaining member is in the closed position, and further wherein in the closed position, a retaining portion of the retaining member is adapted to extend across at least a portion of the proximal surface of the battery assembly.

30. The children's ride-on vehicle of claim 29, wherein the retaining member further includes a handle, and further wherein in at least the open position, at least a portion of the handle extends through the aperture and out of the battery compartment.

31. The children's ride-on vehicle of claim 28, wherein the battery assembly includes a proximal surface that generally faces the aperture when the battery assembly is inserted into the battery compartment and the retaining member is in the closed position, a distal surface that generally faces away from the aperture when the battery assembly is inserted into the battery compartment and the retaining member is in the closed position, and a plurality of sides extending between the proximal surface and the distal surface, and further wherein the retaining member defines a frame that extends around at least the proximal surface, the distal surface and one side of the battery assembly.

32. The children's ride-on vehicle of claim 28, further including a coupling assembly adapted to couple the retaining member relative to the battery compartment.

33. The children's ride-on vehicle of claim 32, wherein the coupling assembly includes track members adapted to define a path of travel for the retaining member between at least the first position and the second position.

34. The children's ride-on vehicle of claim 33, wherein the path of travel is defined by channels formed in the track members, and further wherein portions of the retaining member are adapted to slidably engage with the channels.

35. The children's ride-on vehicle of claim 34, wherein the retaining member further includes protrusions adapted to slidably engage with the channels.

36. The children's ride-on vehicle of claim 35, wherein the channels include at least one detent adapted to retain the retaining member in at least the open position.

37. The children's ride-on vehicle of claim 36, wherein the retaining member is adapted to be disengaged from the at least one detent by movement of the retaining member generally toward the aperture of the battery compartment.

38. The children's ride-on vehicle of claim 28, wherein the retaining member is further adapted to be selectively moved to an intermediate position, above the closed position, in which the retaining portion obstructs removal of the battery assembly from the battery compartment.

39. The children's ride-on vehicle of claim 28, wherein the retaining member is adapted to automatically move to the closed position upon insertion of the battery assembly into the battery compartment and engagement of the retaining member by the battery assembly.

40. The children's ride-on vehicle of claim 28, wherein the retaining member is biased to move to the open position.

41. The children's ride-on vehicle of claim 28, wherein the battery compartment includes sidewalls adapted to restrict movement of the battery assembly within the battery compartment to translation into and out of the battery compartment.

42. A children's ride-on vehicle having at least a first battery-powered component, the vehicle comprising:
   a body having at least one seat for a child and a battery compartment adapted to receive a battery assembly, wherein the battery compartment includes an aperture sized to permit a battery assembly to be selectively inserted into and removed from the battery compartment;
   a battery-powered motor assembly;
   at least one user input device adapted to actuate the battery-powered motor assembly;
   a plurality of wheels rotatably coupled to the body;
   a battery assembly adapted to provide power to the battery-powered motor assembly; and
   a battery retainer assembly adapted to selectively retain the battery assembly within the battery compartment, the battery retainer assembly comprising a retaining member coupled for sliding movement relative to the battery assembly, wherein the retaining member is adapted to be moved between an obstructed position, in which the retaining member obstructs removal of the battery assembly from the battery compartment through the aperture, and an unobstructed position, in which the retaining member does not obstruct removal of the battery assembly from the battery compartment through the aperture and in which the retaining member is adapted to displace the battery assembly at least partially through the aperture.

* * * * *